US010282159B2

(12) United States Patent
Oka

(10) Patent No.: US 10,282,159 B2
(45) Date of Patent: May 7, 2019

(54) INFORMATION PROCESSING APPARATUS FOR TRANSMITTING AN IMAGE TO A DISPLAY APPARATUS AND METHOD OF CONTROLLING THE SAME

(71) Applicant: CANON KABUSHIKI KAISHA, Tokyo (JP)

(72) Inventor: Nobuhiro Oka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 14/140,941

(22) Filed: Dec. 26, 2013

(65) Prior Publication Data
US 2014/0184474 A1 Jul. 3, 2014

(30) Foreign Application Priority Data

Dec. 27, 2012 (JP) ................. 2012-286165

(51) Int. Cl.
G06F 3/14 (2006.01)
G09G 3/00 (2006.01)
G09G 5/14 (2006.01)
H04W 4/08 (2009.01)
G06F 3/0482 (2013.01)

(52) U.S. Cl.
CPC .......... G06F 3/1454 (2013.01); G06F 3/0482 (2013.01); G09G 5/14 (2013.01); H04W 4/08 (2013.01); G09G 3/002 (2013.01); G09G 2354/00 (2013.01); G09G 2370/02 (2013.01); G09G 2370/20 (2013.01)

(58) Field of Classification Search
None
See application file for complete search history.

(56) References Cited

U.S. PATENT DOCUMENTS

2005/0174547 A1* 8/2005 Yamaguchi et al. .......... 353/122
2010/0302130 A1* 12/2010 Kikuchi et al. ................ 345/1.3
2011/0249198 A1 10/2011 D'Alessio et al.
2012/0236023 A1* 9/2012 Yokoyama ........... H04N 9/3179
345/619

FOREIGN PATENT DOCUMENTS

JP 2009-042912 A 2/2009
JP 2012-198585 A 10/2012

OTHER PUBLICATIONS

The above patent documents were cited in the Nov. 21, 2016 Japanese Office Action, which is enclosed without an English Translation, that issued in Japanese Patent Application No. 2012286165.

* cited by examiner

Primary Examiner — David D Davis
(74) Attorney, Agent, or Firm — Cowan, Liebowitz & Latman, P.C.

(57) ABSTRACT

The present invention relates to an image transfer system that transmits an image generated by an information processing apparatus to an image displaying apparatus. Upon detecting an instruction for starting the display of information relating to a network group that is formed via a network and includes the image displaying apparatus, the information processing apparatus that is connected to the image displaying apparatus via the network transmits an instruction for causing a group information image including information relating to the network group to be displayed to the image displaying apparatus via the network.

21 Claims, 10 Drawing Sheets

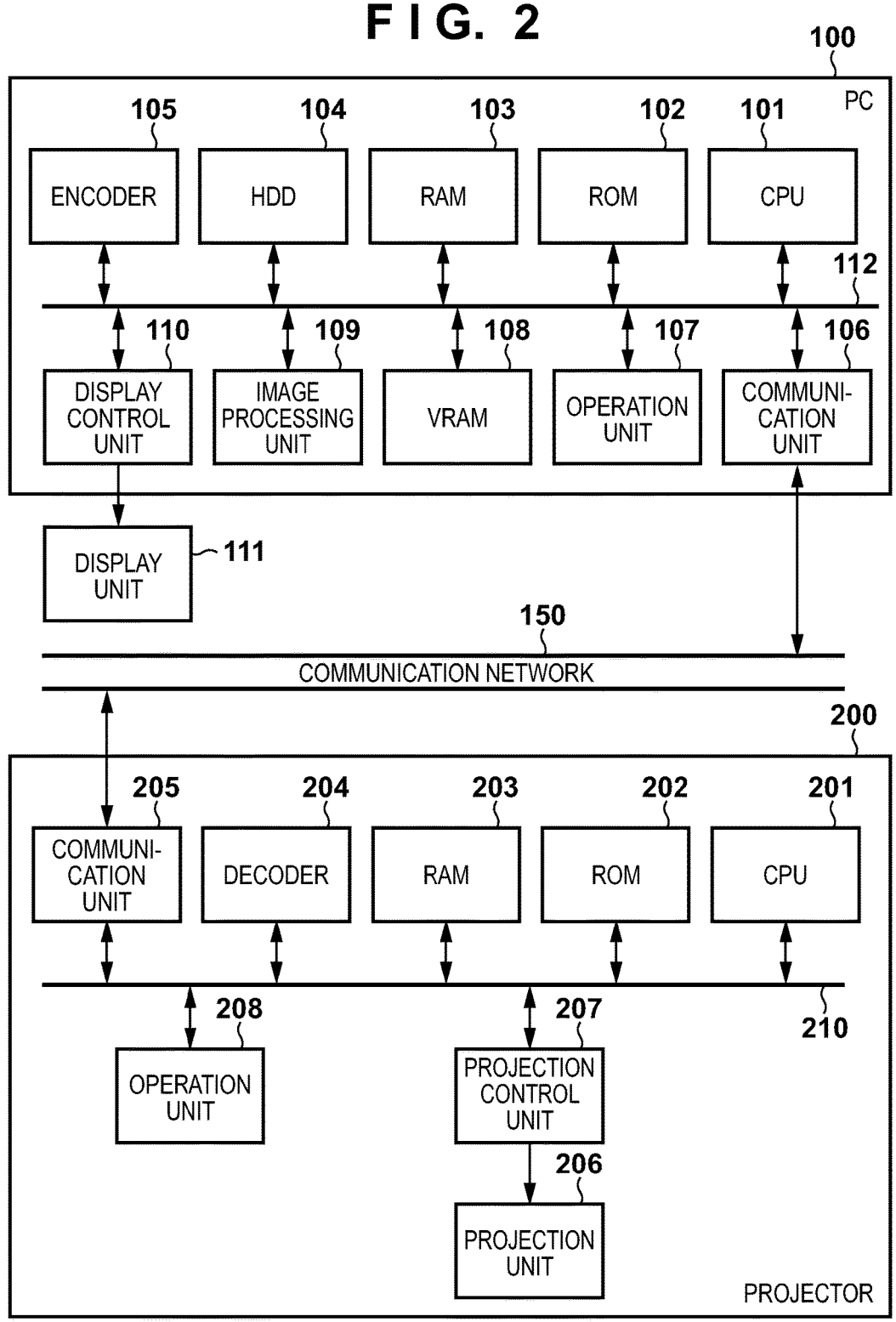

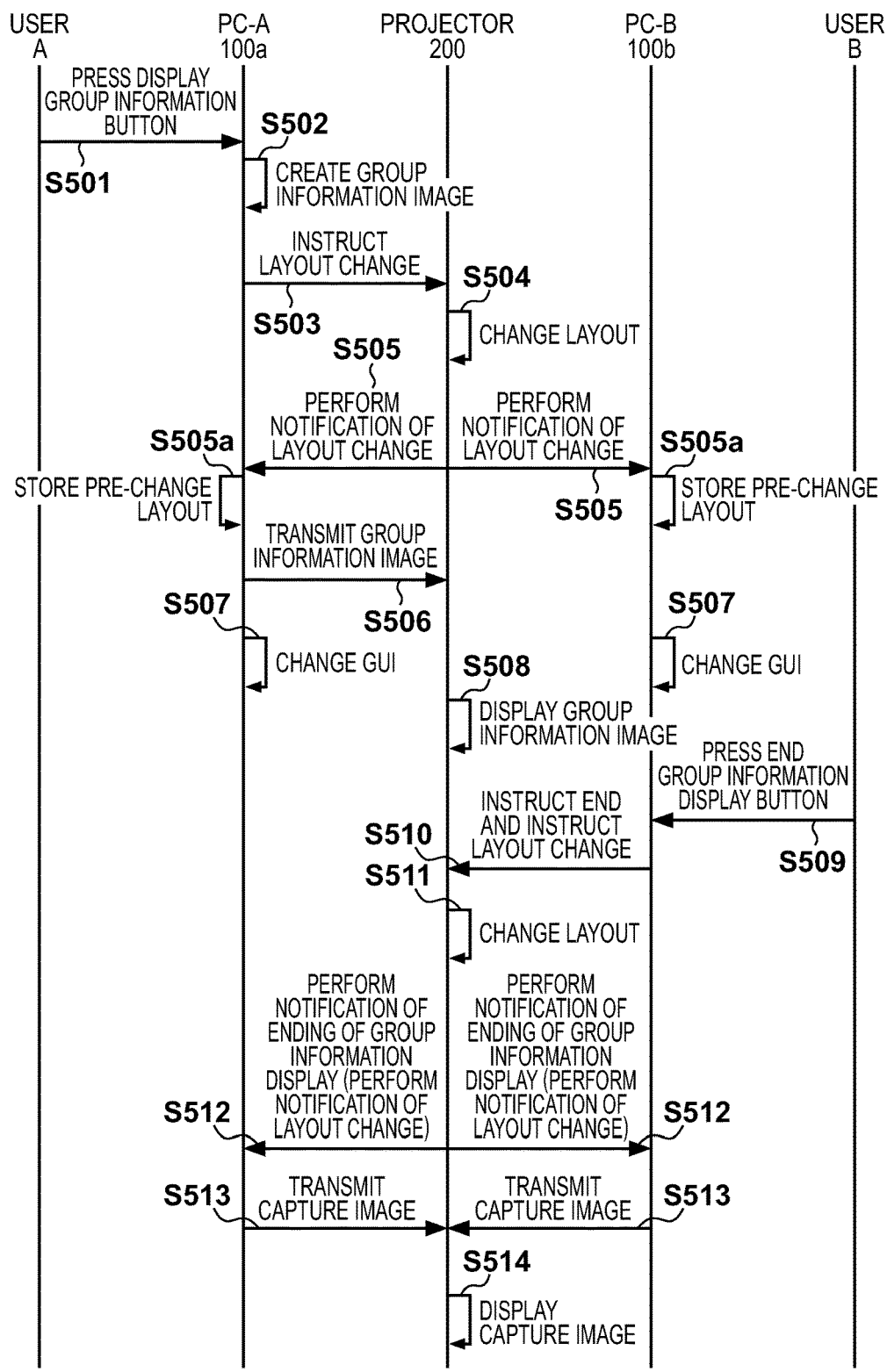

INFORMATION PROCESSING APPARATUS FOR TRANSMITTING AN IMAGE TO A DISPLAY APPARATUS AND METHOD OF CONTROLLING THE SAME

BACKGROUND OF THE INVENTION

Field of the Invention

The present invention relates to an image transfer system that performs display by transmitting an image generated by an information processing apparatus such as a personal computer to an image displaying apparatus such as a projector.

Description of the Related Art

In recent years, projectors that cause image signals received from an information processing apparatus such as a personal computer (hereinafter referred to as a "PC") to be projected onto a screen have often been used when giving presentations during meetings, workshops, and the like. Normally, PCs and projectors perform reception and transmission of image signals via an analog connection using an analog RGB cable. However, with analog connections, there are problems in that it is time-consuming to connect devices, it is difficult to connect from a remote location, and it is not possible to connect multiple PCs at the same time. For these reasons, image transfer systems in which a PC is connected to a projector via a network have been gaining attention.

With this kind of image transfer system that uses a network, functions such as the following are realized.

A function of transmitting images from one PC to multiple projectors and projecting the images using all of the projectors at the same time, A function of displaying images from multiple PCs in a multi-screen layout using one projector. For example, Japanese Patent Laid-Open No. 2009-42912 discloses a technique related to a user interface (UI) for assigning multiple PC images to a projection screen for one projector in an image transfer system.

In order to realize the image transfer system, it is necessary to group the PC and the projector together and establish communication in advance. There are various methods of doing this, such as a method in which the user of the image transfer system first selects all PCs and projectors that he or she wishes to group together. Additionally, if it is possible for another PC to join a group that has already been created, another user who joins while a meeting is in progress can also use the image transfer system, which further increases user-friendliness. However, when the other PC attempts to newly join a group that already exists, the user of that PC needs to know the information for joining that group. Generally, that information is recorded in a specific file or is written on a recording medium such as paper, and thus it is time-consuming for the user to access that information.

SUMMARY OF THE INVENTION

In the present specification, an apparatus and method are disclosed according to which, when a PC is to newly join a pre-existing image transfer group, it is possible for the user of that PC to easily find out the information of the group that he or she wishes to join.

According to one aspect of the present invention, there is provided an information processing apparatus that connects to a projection apparatus via a network and operates as part of a projection system, the information processing apparatus comprising: a transmission control unit configured to perform control to transmit an image to the projection apparatus as a projection image; and a detection unit configured to detect an instruction to project a parameter relating to the projection system, wherein if the instruction is detected by the detection unit, the transmission control unit transmits an instruction to change a projection layout projected by the projection apparatus to a predetermined layout and an image showing the parameter relating to the projection system is transmitted as the projection image.

According to another aspect of the present invention, there is provided a method of controlling an information processing apparatus that connects to a projection apparatus via a network and operates as part of a projection system, the method comprising: a transmission control step of performing control such that an image displayed on a display of the information processing apparatus is transmitted to the projection apparatus as a projection image; and a detection step of detecting an instruction to project a parameter relating to the projection system, wherein if the instruction is detected in the detection step, control is performed in the transmission control step such that an instruction to change a projection layout projected by the projection apparatus to a predetermined layout is transmitted and an image showing the parameter relating to the projection system is transmitted as the projection image.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing an example of a configuration of a PC and a projector that configure an image transfer system.

FIG. 5 is a sequence diagram showing a group information image display operation according to an embodiment.

DESCRIPTION OF THE EMBODIMENTS

First Embodiment

Examples of preferred embodiments of the present invention will be described in detail below with reference to the accompanying drawings.

Figure 1:
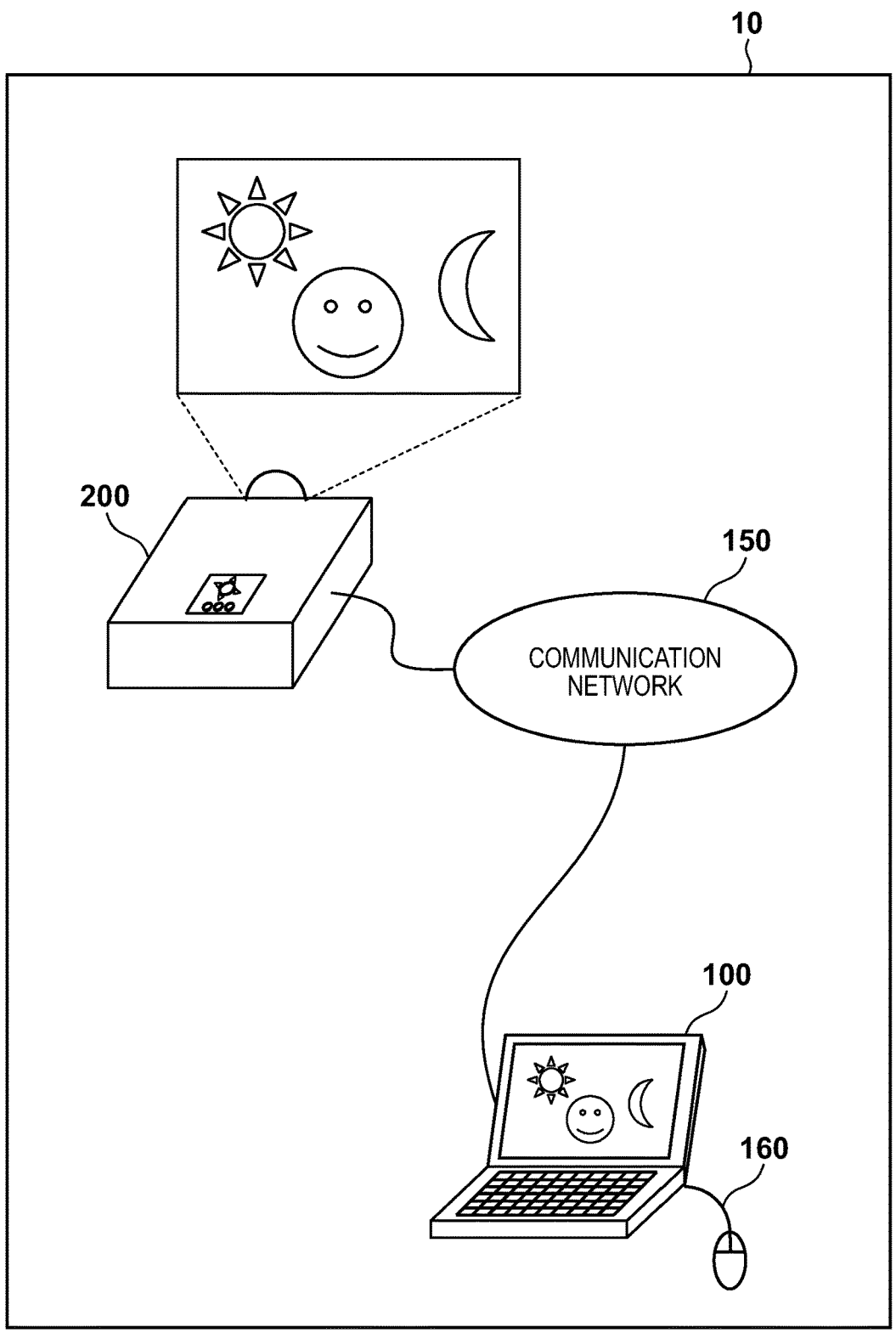
FIG. 1 is a diagram showing an example of an image transfer system according to an embodiment.

FIG. 1 is a diagram showing an example of an image transfer system in which an information processing apparatus and an image displaying apparatus of the first embodiment are communicably connected. An image transfer system 10 of the present embodiment includes a PC 100 that is an example of an information processing apparatus that functions as an image transfer apparatus, and a projector 200 that is an example of an image displaying apparatus. The PC 100 and the projector 200 can each be connected to an external device via a LAN or the like, and in the present embodiment, the PC 100 and the projector 200 are communicably connected to each other via a communication network 150. Note that the communication network 150 may be wired or wireless.

To give a simple description of the roles of each device, the PC 100 can transmit image signals that correspond to the image being displayed on the display to the projector 200 via the connection network 150. The projector 200 receives image signals sent from the PC 100, converts them into a format that can be output, and projects them onto a screen. Additionally, at this time, a pointer in the window system in the PC 100 is operated using a mouse 160, and the pointer display position is transmitted to the projector 200 separately from the image signals. Note that the window system mentioned here is a Graphical User Interface (GUI) that is realized by Windows (registered trademark), for example, which is an operating system (referred to as "OS" below) provided by Microsoft Corporation. With this window system, it is possible to allocate unique areas to multiple tasks and multiplex output screens using the GUI.

FIG. 2 is a block diagram showing an example of a schematic configuration of the image transfer system 10 configured by the PC 100 and the projector 200. The PC 100 has a CPU 101, a ROM 102 for storing a control program describing the processing procedure of the CPU 101, and a RAM 103 that temporarily stores the control program and data as a work memory. Additionally, the PC 100 includes a hard disk drive 104 for storing data and programs such as applications and an OS, and an encoder 105 for compressing image data that is to be displayed by the PC 100. Furthermore, the PC 100 includes a communication unit 106 that is an interface for communicating with the projector 200, a server, and the like via a LAN or the like, and an operation unit 107 that processes user input from a keyboard and a pointing device (e.g., a mouse). Furthermore, the PC 100 includes a VRAM 108 that stores images that are to be displayed by a display unit 111, an image processing unit 109, a display control unit 110, the display unit 111 such as a liquid crystal display, and an internal bus 112 that connects these elements.

The projector 200 includes a CPU 201, a ROM 202 for storing a control program describing the processing procedure of the CPU 201, and a RAM 203 that temporarily stores the control program and data as a work memory. Also, the projector 200 has a decoder 204 for decoding data that was compressed with a predetermined compression format. Furthermore, the projector 200 includes a communication unit 205 that is an interface for connection with the PC 100, and an operation unit 208 that processes user input from various types of operation buttons, an operation remote control, and the like. Furthermore, the projector 200 includes a projection control unit 207 for outputting an image; a projection unit 206 configured by a liquid crystal panel that projects an input image and a driver for the same, a lens and a driving system for the same, and a light source; and an internal bus 209 that connects all of these elements.

Note that the hardware configurations of the apparatuses in the present embodiment are not limited to the description above. For example, it is possible to execute control of an apparatus using one piece of hardware, and it is possible to realize overall control of the apparatus while processing is divided among multiple pieces of hardware.

Also, although the PC 100 was used as an example of an information processing apparatus functioning as an image transmission apparatus and the projector 200 was used as an example of an image displaying apparatus in the present embodiment, the present invention is not limited to this. Examples of such information processing apparatuses include digital cameras, mobile phones, and the like. Also, examples of image displaying apparatuses include devices for controlling display such as televisions and monitors.

Description of Procedure for Creating New Image Transfer Group

Next, processing up to and including when the PC 100 and the projector 200 according to the present embodiment create an image transfer group, which is a network group for performing image transfer, and establish communication will be described with reference to FIGS. 3A to 3D.

1. Operation of PC 100

The operations of the PC 100 that will be described below are realized by a program (e.g., a program stored in the ROM 102 or a program loaded to the RAM 103) that is operated by the CPU 101 in the PC 100. The program is an image transfer application in the present embodiment.

First, when the user instructs the start of the image transfer application via the operation unit 107, the CPU 101 is notified of the instruction. After starting execution of the image transmission application, the CPU 101 determines whether to transmit a join request to an image transfer group that already exists on the network, or to create a new image transfer group, according to a user instruction.

Figure 3A:
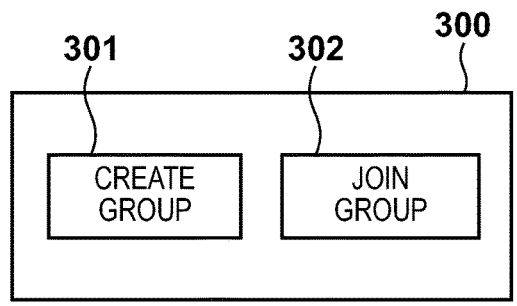
FIGS. 3A to 3D are diagrams showing examples of GUIs of an image transfer application.
Figure 3C:
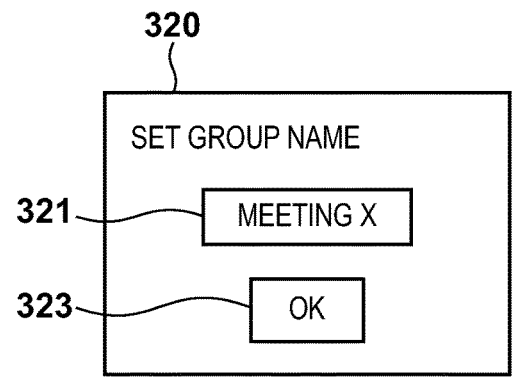

At this time, immediately after starting execution of the image transfer application, the CPU 101 first creates a GUI 300 shown in FIG. 3A, displays it on the display unit 111, and waits for a user operation. The GUI 300 is configured by a create group button 301 and a join group button 302. If the user presses the create group button 301 via the operation unit 107, the procedure of creating a new image transfer group is started. On the other hand, if the user selects the join group button 302, the procedure of joining an image transfer group that already exists on the network is started. Here, the description will continue based on the premise that the user has selected the create group button 301.

The CPU 101 performs control of the communication unit 106 in order to transmit a command to search for a projector that exists on the network using broadcast or multi-cast transmission, and waits for a response command from the projector. If a projector capable of responding to the above-mentioned projector search command exists on the network, that projector will respond with a response command, similarly using broadcast or multi-cast transmission. Note that the response command that is sent from the projector includes various types of information such as the IP address of the projector, and whether or not it is possible to connect to that projector.

Figure 3B:
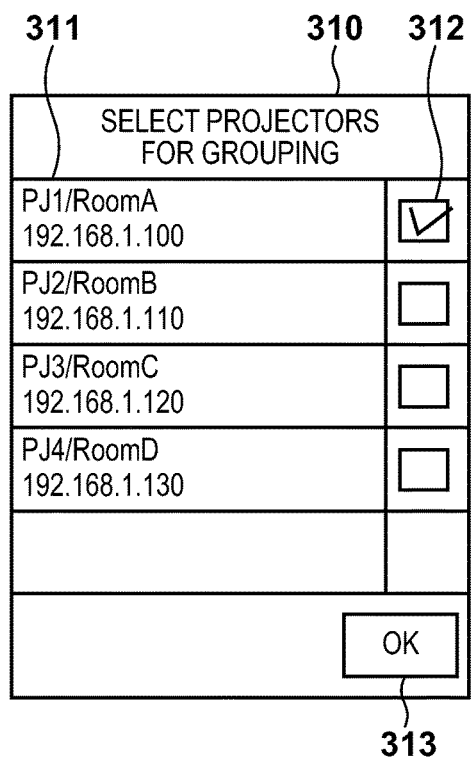
Figure 3D:
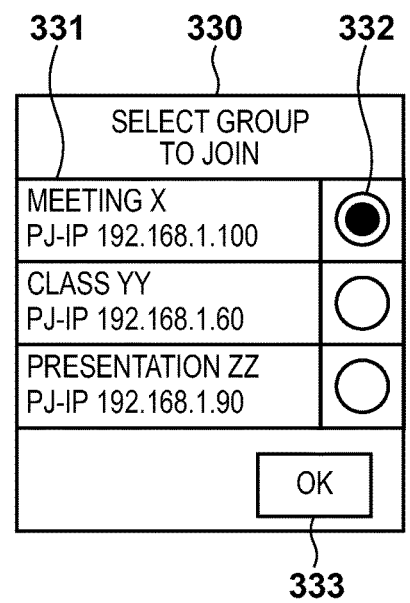

When the communication unit 106 receives the response command, the CPU 101 recognizes connectable projectors by analyzing the response command and displays a list of connectable projectors on the display unit 111 by creating a GUI 310 such as that shown in FIG. 3B. The GUI 310 is configured by an area 311 that displays connectable projector information, checkboxes 312 by which it is possible to select one or more projector for grouping, and an OK button 313. The user of the PC can select a projector on the list by checking the checkbox of the projector that he or she wishes to form a group with. Upon completing the selection of the projector, the user of the PC 100 presses the OK button 313.

When the OK button 313 is pressed, the CPU 101 generates a connection request command, transmits the connection request command to the user-selected projector via the communication unit 106, and waits for a reply command from that projector.

Next, when the communication unit 106 receives the reply command from the projector in response to the above-mentioned connection request command, the CPU 101 analyzes the reply command and determines whether or not the connection request was approved by the projector. If it is determined that connection was permitted, the CPU 101 creates a GUI 320 such as that shown in FIG. 3C and displays the GUI on the display unit 111. A group name input area 321 in the GUI 320 is an area for inputting the group name of the image transfer group that is currently being created, and after inputting a desired group name in the group name area 321, the user of the PC presses an OK button 323.

Figure 4:
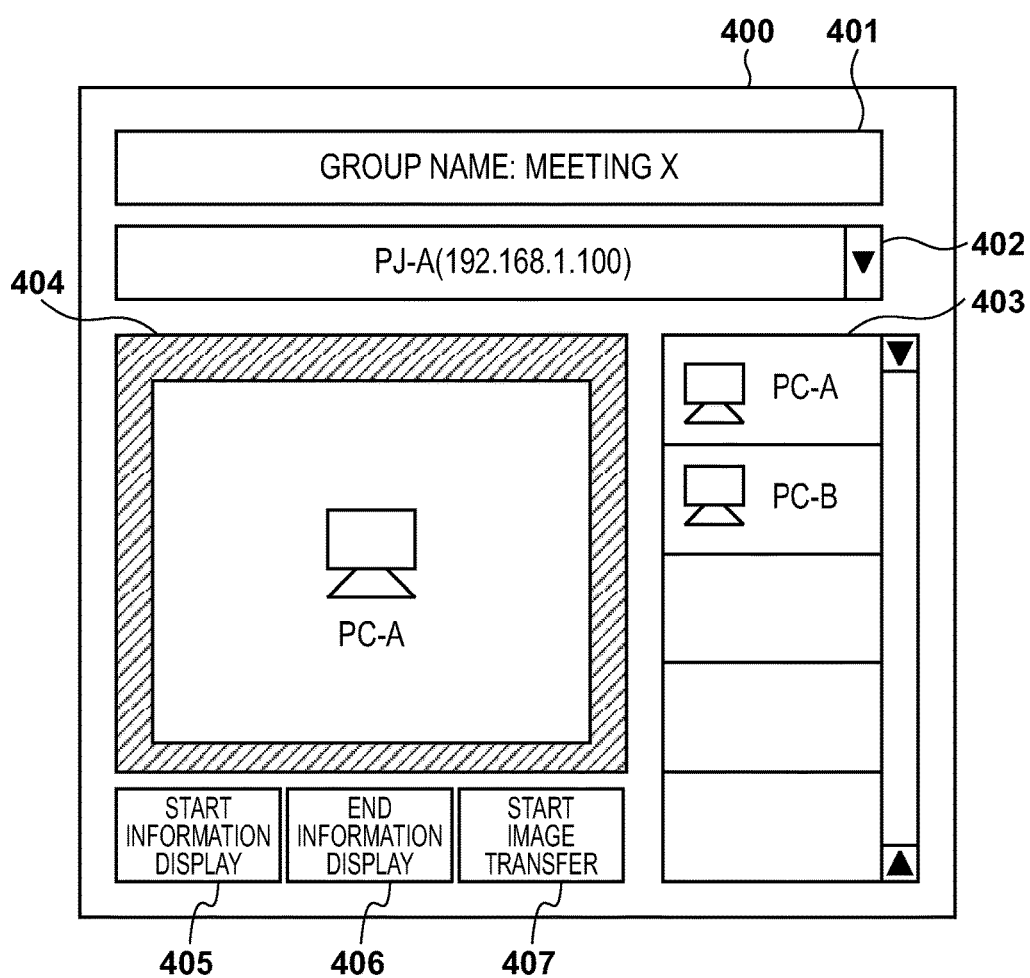
FIG. 4 is a diagram showing an example of a GUI of an image transfer application.

The CPU 101 creates a GUI 400 such as that shown in FIG. 4 for controlling the starting and ending of processing for transmitting image data to the selected projector, and the CPU 101 presents the GUI 400 to the user via the display unit 111. Processing for creating a new image transfer group has been described above.

Portions of the GUI 400 will be described below. Area 401 is an area showing the group name of the image transfer group. Area 402 is an area showing information regarding the projector that is the target of image transmission. Area 403 is an area showing information regarding the PCs that have joined the image transfer group. Area 404 is a display layout area showing a display layout in the projector that is the target of image transmission. If the projection layout of the projector is changed, the CPU 101 updates this area. Button 405 is a start information display button that instructs the start of the display of image transfer group information. Button 406 is an end information display button that instructs the end of the display of image transfer group information. Button 407 is a start image transfer button that instructs the start of image transfer. Note that notification of the information displayed in the areas 401 to 404 is performed by the projector 200 while the operation of the image transfer group is in progress, and the information is stored in the RAM 103. The CPU 101 creates the GUI 400 based on the information that is stored in the RAM 103.

2. Operation of Projector 200

Operations of the projector 200 in the processing for creating a new image transfer group will be described now. When the communication unit 205 of the projector 200 receives a projector search command, the CPU 201 generates a response command that stores various types of information such as the IP address of the projector 200, and whether or not the PC can be connected to. The CPU 201 performs control of the communication unit 205 in order to broadcast or multi-cast the response command over the network.

Next, when the communication unit 205 receives a connection request command from the PC 100, the CPU 201 analyzes the connection request command. Then, the CPU 201 controls the communication unit 205 in order to transmit a reply command in response to the connection request command to the PC 100 that is the transmission source of the connection request command, and the CPU 201 permits the connection. The PC 100 with which connection was permitted is recorded in the RAM 203 and managed by the CPU 201 as a connection-permitted PC, and it is the target of subsequent image data reception, projection processing, and the like.

The procedure by which the PC 100 and the projector 200, which configure an image transfer system create a new image transfer group and establish communication has been described above.

Method for PC to Join Existing Group

In the image display system of the present embodiment, the PC 100 can join an image transfer group that already exists on the same network. The following describes operations of the PC 100 at that time.

First, when the user instructs the start of the image transfer application via the operation unit 107, the CPU 101 is notified of the instruction. At this time, immediately after executing the image transfer application, the CPU 101 first creates the GUI shown in FIG. 3A, displays it on the display unit 111, and waits for a selection from the user. Here, the description will continue based on the premise that the user has pressed the join group button 302.

The CPU 101 waits for the communication unit 106 to receive the information regarding the image transfer group that exists on the network. The information regarding the image transfer group includes various types of information such as the group name and the IP address of the projector and is broadcast or multi-cast periodically by a projector that has already joined the image transfer group.

When the communication unit 106 receives the image transfer group information, the CPU 101 analyzes the received image transfer group information and recognizes image transfer groups that can be joined. Then, the CPU 101 creates the GUI 330 including a list of image transfer groups that can be joined, such as that shown in FIG. 3D, and displays it on the display unit 111.

The GUI 330 has an area 331 for displaying group information, radio buttons 332 that enable selection of the projector that is to be grouped, and an OK button 333. The user of the PC 100 can select the desired image transfer group from the list by checking the radio button of the image transfer group that he or she wishes to join. Upon completing the selection of the image transfer group, the user of the PC 100 presses the OK button 333.

Next, the CPU 101 performs control of the communication unit 106 in order to transmit a connection request command requesting to join a group to the projector in the selected image transfer group and waits for a reply to the command.

Next, when the communication unit 106 receives the reply to the above-mentioned group join request command from the projector, the CPU 101 analyzes the reply to the group join request command and determines whether or not the PC 100 has been permitted to join the group. Upon determining that connection has been permitted, the CPU 101 creates the GUI 400 (FIG. 4) for controlling the start of processing for transmitting image data to the projector, and presents the GUI to the user via the display unit 111. Processing for the PC 100 to join an existing image transfer group has been described above.

In response to the connection request command transmitted by the PC 100, the projector 200 transmits a reply command and manages the PC 100 as a connection-permitted PC.

Procedure for PC to Transfer Image to Projector and Display

The following describes processing in which the PC 100 transmits image data to the projector 200 and the projector 200 projects the image data. Note that the present processing is started due to the user of the PC 100 pressing the start image transfer button 407 in FIG. 4 via the operation unit 107.

First the CPU 101 performs control of the display control unit 110 in order to transfer the image data currently being displayed on the display unit 111 from the VRAM 108 to the RAM 103. Note that this operation of the CPU 101 will hereinafter be referred to as a "capture". Next, the image data that was stored in the RAM 103 through the capture processing is encoded and stored in the RAM 103 due to the CPU 101 controlling the encoder 105. Here, the method used to encode is JPEG encoding, which is generally used for image data compression. Note that the compression method is not limited to this, and any mode may be employed as long as it can be decoded by the projector 200.

Next, the CPU 101 performs control of the communication unit 106 in order to transmit the encoded image data that is stored in the RAM 103 to the projector 200. Following the instruction to start image transfer, the CPU 101 repeats the above-described capture, encoding, and image data transmission processing periodically, or in response to a change in the display unit 111 until an instruction to stop image transfer from the user is detected.

In the projector 200, when the communication unit 205 receives the image data that was transmitted according to the above-described operation of the PC 100, the CPU 201 stores the image data in the RAM 203. Next, the CPU 201 performs control of the decoder 204 in order to perform decoding processing on JPEG encoded image data stored in the RAM 203. Here, the decoded image data is stored in a VRAM region reserved in the RAM 203. Next, the CPU 201 performs control of the projection control unit 207 in order to read out the image data stored in the VRAM region and project it from the projection unit 206.

Normal processing up to and including when the projector 200 receives the image data transmitted from the PC 100 and projects that image data in the image transfer system of the present embodiment has been described above.

Procedure of Displaying Group Information

Figure 6A:
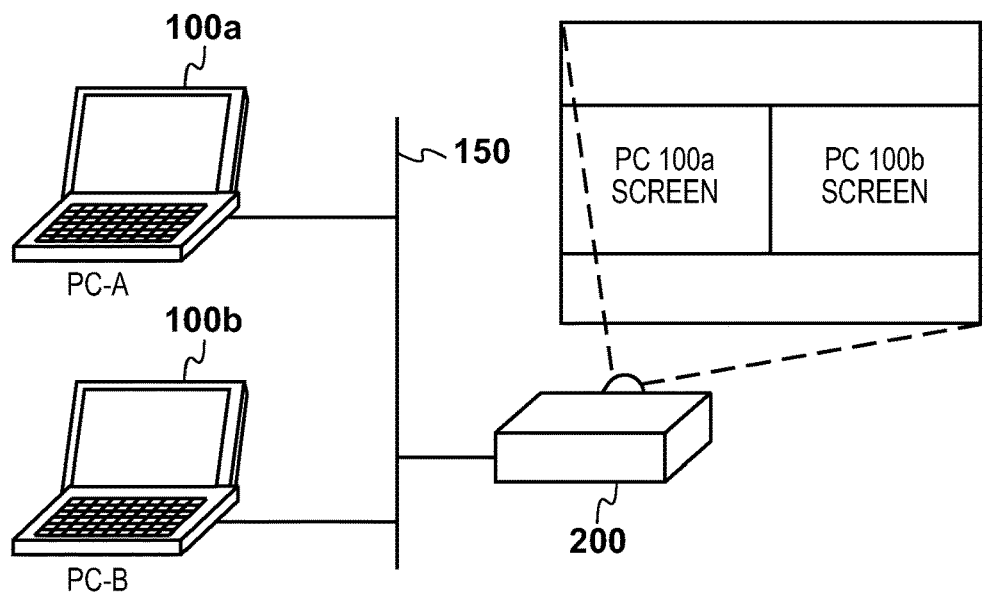
FIGS. 6A, 6B, 7A, 7B, 8A, and 8B are diagrams for describing a relationship between a projected image of an image transfer application and a GUI of an image transfer application.
Figure 6B:
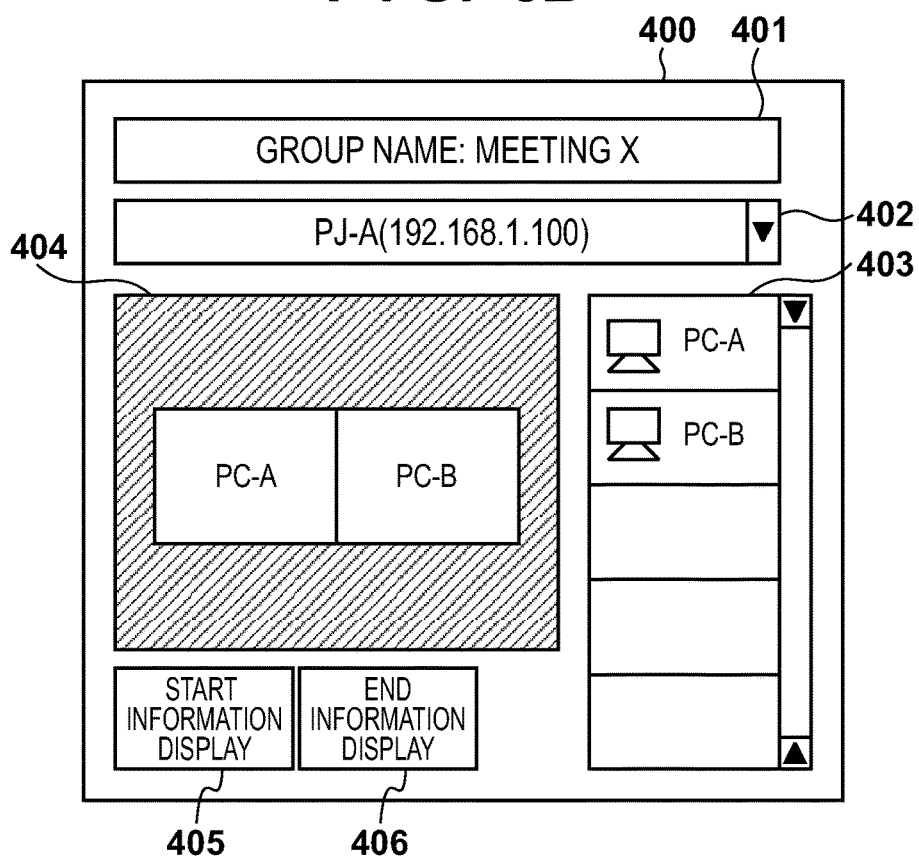

Next, an operation sequence for displaying group information using the PC 100 and the projector 200 will be described with reference to the sequence diagram in FIG. 5. Here, the image transfer group is configured by two PCs, namely a PC 100a and a PC 100b (referred to as PC-A and PC-B below), and the projector 200. Also, the transferred images of the respective PCs are projected by the projector using picture-by-picture (PbyP) as shown in FIG. 6A. Additionally, at this time, the GUI 400 is displayed in a manner as shown in FIG. 6B on the display units of the PC-A and the PC-B.

This sequence is started due to the user of the PC-A pressing the start information display button 405 in the GUI 400 via the operation unit 107 (step S501). The CPU 101 of PC-A that detects that the button has been pressed creates a group information image 700 such as that shown in FIG. 9 based on the information stored in the RAM 103 regarding the image transfer group that the PC-A is currently included in, and controls the encoder 105 to perform encoding. The encoded group information image 700 is stored in the RAM 103 (step S502). Note that in the present embodiment, the group information image includes the IP address of the projector that forms the image transfer group with the PC-A and the group name. This is the same as the information displayed in the area 401, which displays the group information in the GUI 400. However, the information included in the group information image 700 is not limited to this, and the content may be anything as long as it is information that the PC 100 needs in order to join the existing image transfer group.

Next, the CPU 101 performs control of the communication unit 106 in order to transmit the group information image 700 stored in the RAM 103 and a layout change instruction to the projector 200 (step S503). Although the description will continue below based on the premise that the layout change instruction in the present embodiment is an instruction for performing a full-screen display of the group information image that is to be transmitted by the PC-A at the present time using the projection unit 206 of the projector 200, the layout change instruction is not limited to this. Another example of a layout change instruction will be described in detail later.

When the communication unit 205 of the projector 200 receives the layout change instruction that was transmitted according to the above-described operation of the PC-A, the CPU 201 performs control of the projection control unit 207 in order to change the layout of the projected image based on the received layout change instruction (step S504). In the present example, the layout is changed to a full-screen display of an image from the PC-A. Also, the CPU 201 may prevent the image transmitted from the PC to the projection unit 206 from being displayed in the period of time from when the layout change operation is received until when the group information image 700 is received (step S506). Alternatively, it is possible to control the projection control unit 207 such that a predetermined image such as a full-screen black image for displaying the entire screen in black is displayed in that period of time. By doing so, it is possible to prevent the state during the layout change of the projected image in the projector from being shown to the user.

The CPU 201 performs control of the communication unit 205 in order to perform notification of the content of the display layout change to the PCs (PC-A and PC-B in the present example) in the same image transfer group (layout change notification: step S505). According to the layout change notification from the projector 200, the CPU 101 of the PC 100 recognizes that the layout change instruction that was transmitted in step S503 was received, and/or that the layout change according to the layout change instruction is complete. Also, the CPU 101 of the PC 100 stores the projection layout information of the projector 200 that was used before the layout change in the RAM 103 (step S505a). Thus, the layout information indicating the layout from immediately before the screen layout is changed in accordance with the layout change instruction is stored.

Figure 7A:
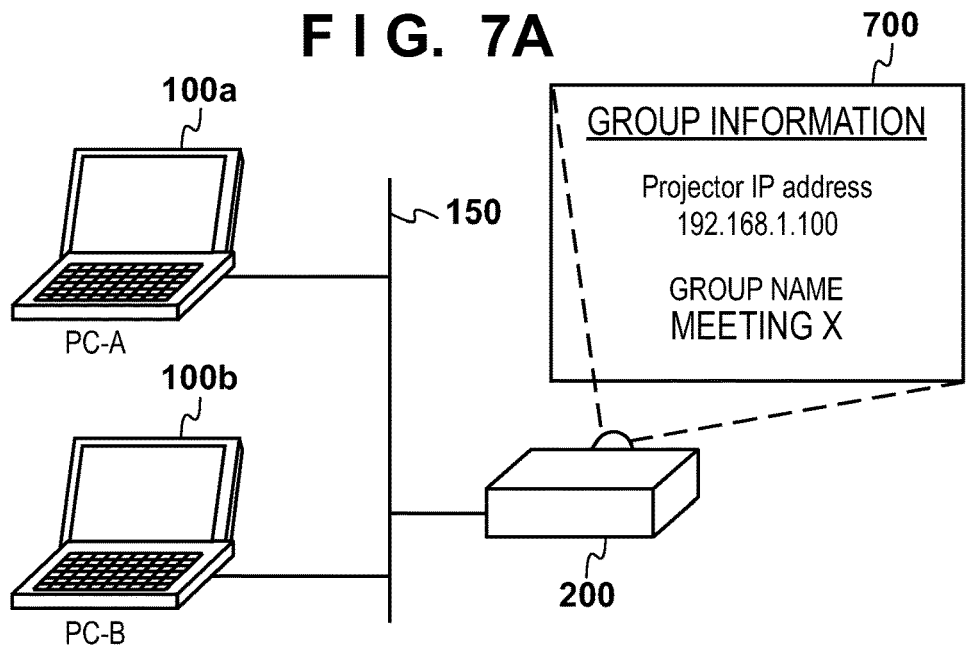
Figure 7B:
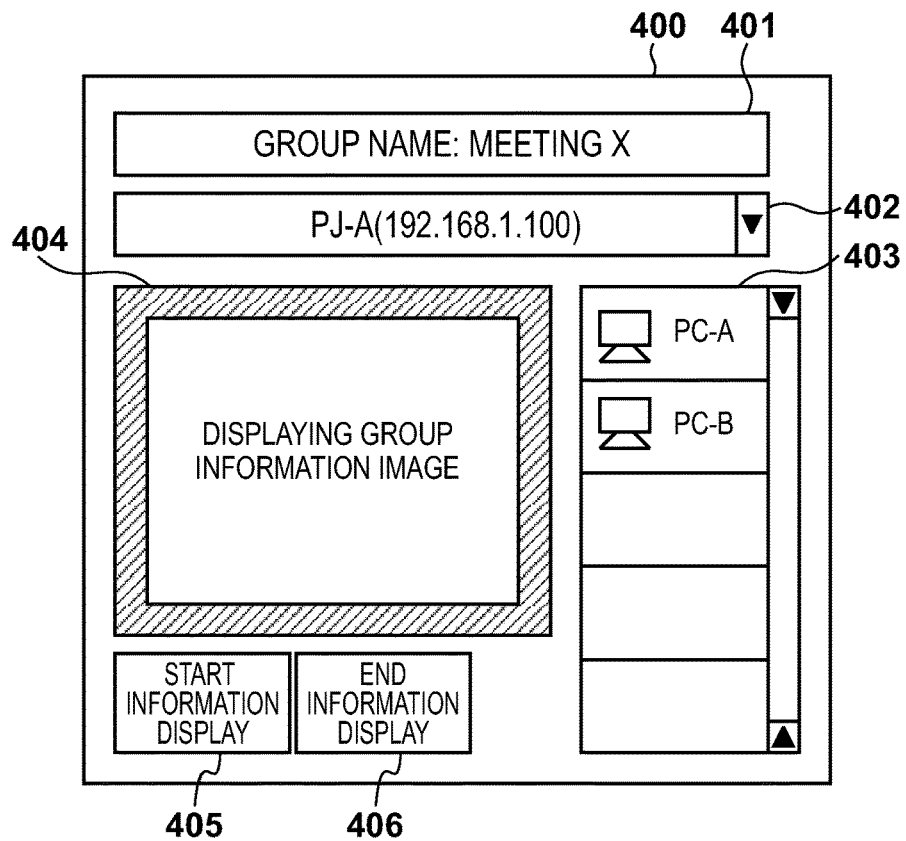

Next, the CPU 101 of the PC-A performs control of the communication unit 106 in order to transmit the encoded group information image 700 that is stored in the RAM 103 to the projector 200 (step S506). Next, the CPUs 101 of the PC-A and the PC-B change the appearance of the display layout area 404 in the GUI 400 as shown in FIG. 7B based on the content of the layout change received from the projector 200 via the communication unit 106 (step S507).

Upon detecting that the communication unit 205 received the group information image 700, the CPU 201 of the projector 200 performs control of the decoder 204 in order to subject the group information image 700 to decoding processing. The decoded image data is stored in the RAM 203 (VRAM region). The CPU 201 performs control of the projection control unit 207 in order to read out the group information image 700 stored in the RAM 203 and project it from the projection unit 206 for display (step S508). The projected image being projected by the projector 200 at this time is in a state in which the group information image 700 is displayed on the entire screen, as shown in FIG. 7A.

Note that in the above description, in steps S503 to S508, the PC-A first instructs the projector 200 to perform a layout change and subsequently, after receiving the layout change notification from the projector 200, transmits the group information image. However, the procedure of transmitting and receiving the layout change instruction and the group information image is not limited to this.

For example, the PC-A may transmit the layout change instruction and the group information image to the projector 200 at the same time. In such a case, the CPU 201 of the projector 200 performs control of the projection control unit 207 in order to first change the layout in accordance with the layout change instruction and subsequently operate so as to cause the group information image 700 to be projected.

Also, a configuration is possible in which the PC-A transmits instruction information instructing the projector 200 to first change the layout and subsequently project the group information image 700, and the CPU 201 of the projector 200 operates in accordance with that instruction.

As described above, the projector 200 that is included in an image transfer group has a configuration in which it is possible to display the group information image transmitted from the PC-A in the entirety of the projection region, even in the case where images transmitted from the PC-A and the PC-B are projected using PbyP. Accordingly, the PC user who wishes to join that group can visually confirm the image transfer group information in the appropriate layout and can easily find out the information that is needed in order to join the group.

It is also possible for the CPU 101 to operate in the following manner in step S503. The CPU 101 acquires the layout information of the projector 200 stored in the RAM 103 and determines whether or not the image that it transmitted is in a predetermined projection state. For example, in the case where the image that it transmitted is not a projection target, or in the case where the image is projected but images transmitted from multiple PCs at the same time are displayed by picture-in-picture (PinP) display, or by PbyP display, if a percentage with respect to the projection region is less than a predetermined percentage, it is determined that the image is not in the predetermined projection state. Then, if it is determined that the image is not in the predetermined projection state, the CPU 101 performs control of the communication unit 106 in order to transmit the group information image 700 stored in the RAM 103 and the layout change instruction to the projector 200.

Figure 8A:
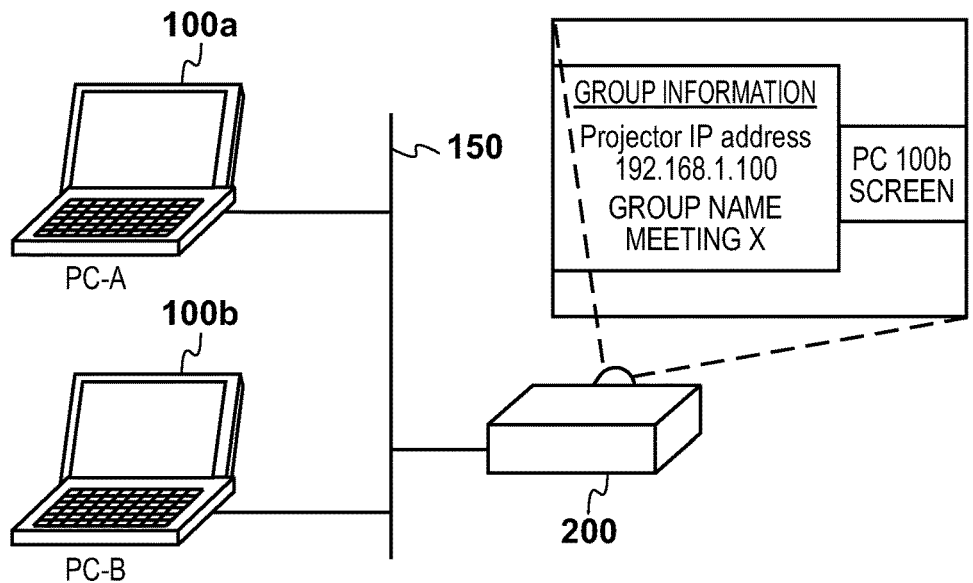
Figure 8B:
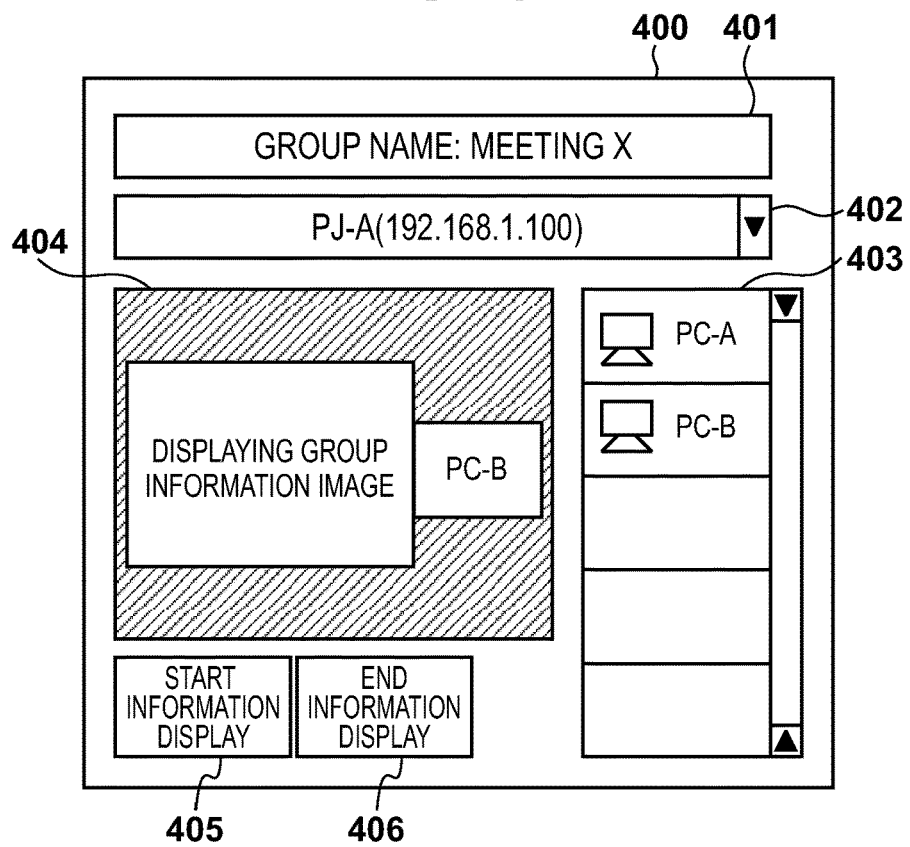

The layout change instruction may be an instruction for performing a full-screen display of the image that it transmitted as described earlier, for example. Also, if the projector 200 is performing PinP display or PbyP display, the layout change instruction may be an instruction for setting the size of the transmission image display region to a value that is at or above the predetermined percentage. If the PC-A operates in this manner, the projected image being projected by the projector 200 will be as shown in FIG. 8A, and the GUI 400 of the PC-A and the PC-B will be as shown in FIG. 8B.

On the other hand, if it is determined that the projector 200 is in the predetermined projection state, the CPU 101 may operate so as to transmit the group information image 700 without giving the layout change instruction.

Procedure of Ending Group Information Display

The description will now return to the sequence in FIG. 5. Step S509 is a flow for ending the display of the group information image 700. In the present embodiment, the case where the end information display button 406 is pressed in the GUI 400 of the PC-B will be described as an example. First, the pressing of the end information display button 406 by the user in the GUI 400 of the PC-B is detected (step S509). The CPU 101 of the PC-B that detected that the end information display button 406 was pressed transmits an end display instruction for the group information image 700 and a layout change instruction to the projector 200 via the communication unit 106 (step S510). The layout change instruction that is transmitted at this time is an instruction to change to the display layout from before the layout change for displaying the group information image 700, the display layout having been stored in the RAM 103 of the PC-B in step S505.

Upon detecting that the end display instruction for the group information image and the layout change instruction were received via the communication unit 205, the CPU 201 of the projector 200 instructs the projection control unit 207 to change the layout based on the layout change instruction. The projection control unit 207 changes the layout of the projection unit 206 in accordance with the instruction (step S511). Thus, the display performed by the projector 200 returns to the display layout from before the layout change for displaying the group information image 700.

Next, the CPU 201 performs control of the communication unit 205 in order to notify the PCs in the same image transfer group (PC-A and PC-B in the present example) that the display of group information will end, and transmit the layout that was changed in step S511 for the layout to be used after the group information display ends (step S512). Next, upon detecting that the instruction to end the display of group information was received via the communication unit 106, the CPUs 101 of the PC-A and the PC-B each capture the image data currently being displayed on the display unit 111 and encode it. Then, the image data is transmitted to the projector 200 via the communication unit 106 (step S513). The CPU 201 of the projector 200 causes the projection unit 206 to project the images from the PC-A and the PC-B that were received via the communication unit 205 (step S514).

When the display of the group information image 700 ends, it is possible to resume image display in the layout that was used before the group information image was displayed, such as the layout shown in FIG. 6A, due to the PC-A, the PC-B, and the projector 200 operating in the above-described manner.

Note that in steps S509 to S514, a sequence was described in which a PC (PC-B) that is not transmitting the group information image 700 instructs the projector 200 to end display of the image. However, the instruction to end the display of the group information image 700 may of course be carried out by the PC-A, and it is sufficient that the PC-A performs operations that are similar to those performed by the PC-B, which were described in steps S509 and S510.

Note that in step S509, the detection of an event that is a trigger to start the flow for ending the display of the group information image 700 was described using the detection of the pressing of the end information display button 406 by a user operation as an example, but the present invention is not limited to this. For example, control may be performed such that after displaying the group information image, the fact that a predetermined number of PCs are included in the new image transfer group is detected as an event to start the end display flow. The following describes operations of the PC 100 and the projector 200 in the case of employing control according to this type of event detection.

When the projector 200 approves a new connection request from a PC (PC-C) using the above-described procedure, the PC-A and PC-B are notified of the fact that the PC-C has newly joined the image transfer group. Upon receiving the join notifications for a predetermined number of PCs, the CPU 101 of the PC-A or the PC-B executes the sequence starting from step S510. Thus, it is possible to cause the display of the group information image to end automatically using the fact that a predetermined number of PCs are included in the image transfer group as a trigger. Note that a configuration is possible in which the projector 200 counts the number of PCs that have newly joined, and if the count value reaches or exceeds a predetermined value, the procedure automatically moves to the sequence starting from step S511. In such a case, it is necessary for the projector 200 to hold the layout information from before the group information image is displayed. Another start trigger for the flow for ending the display of the group information image 700 has been described above.

Additionally, it is desirable that the ending of group information image display and display layout change are prohibited while the projector 200 is displaying the group information image in step S508 unless the start trigger for the above-described end display flow is given.

Examples of methods for prohibiting display layout change include the CPU 201 of the projector 200 ignoring a layout change request sent from a PC in the group. Also, the CPU 201 may instruct the PCs in the group (PC-A, PC-B) to restrict layout change requests. As described above, by restricting projection layout during the display of the group image unless a predetermined operation is performed, it is possible to maintain the display of the group information image even if the PC user mistakenly requests a layout change.

Second Embodiment

Figure 10:
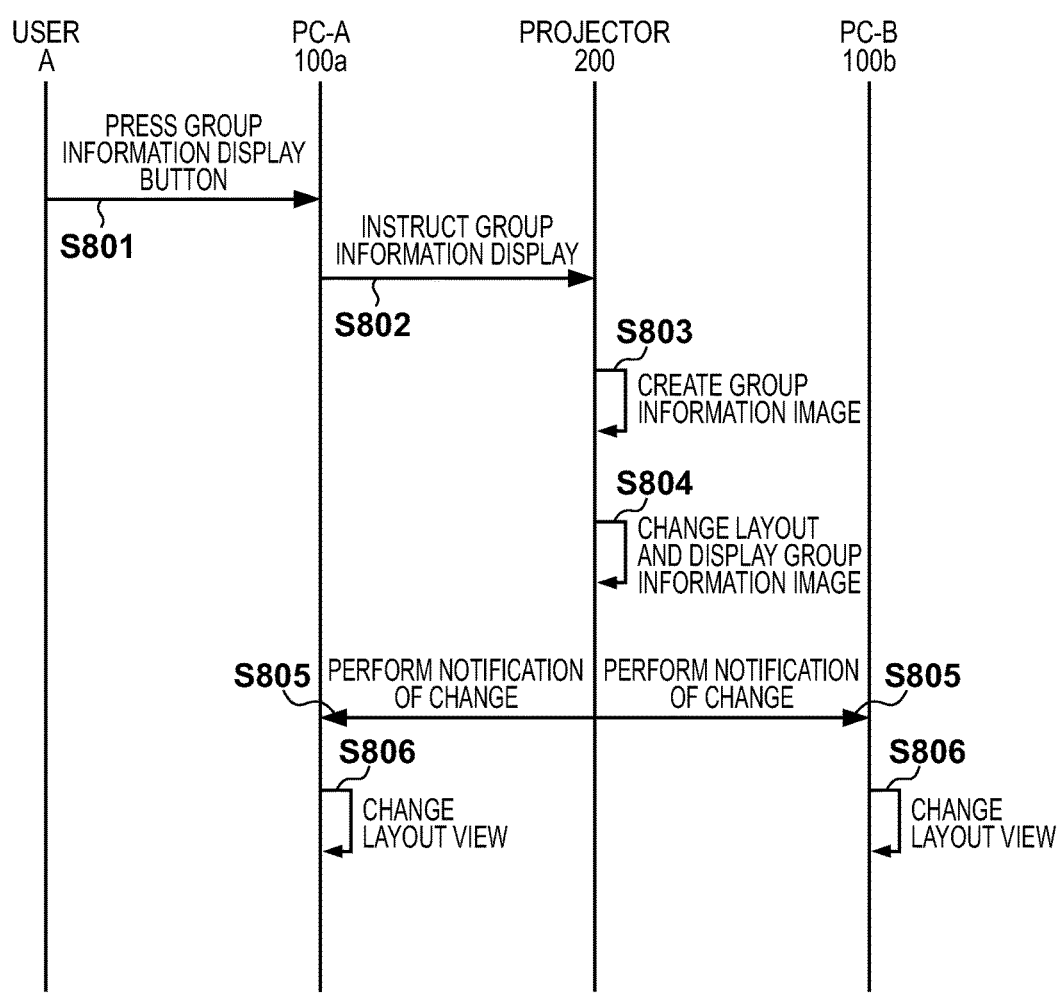
FIG. 10 is a sequence diagram showing a group information image display operation according to another embodiment.

In the above-described first embodiment, the PC 100 generated a group information image and caused the projector 200 to display it, but the present invention is not limited to this. In a second embodiment, a configuration will be described in which the projector 200 creates and projects the group information image. An image transfer system configured by the PC 100 and the projector 200 of the second embodiment will be described below with reference to FIG. 10. Note that since the configurations of the PC 100 and the projector 200 of the second embodiment are similar to those in the first embodiment (FIG. 1 to FIGS. 3A to 3D), the description thereof will not be repeated.

It is assumed that a user A of the PC-A presses the start information display button 405 of the GUI 400 (step S801). The CPU 101 of the PC-A that detected that the start information display button 405 was pressed performs control of the communication unit 106 in order to transmit an instruction to start the display of the group information to the projector 200 (step S802).

Figure 9:
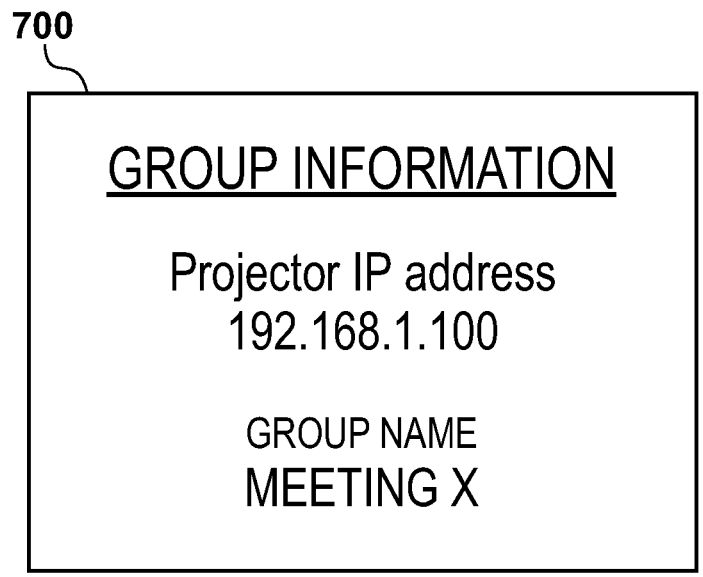
FIG. 9 is a diagram showing an example of a group information image.

Upon receiving the instruction to start displaying the group information via the communication unit 205, the CPU 201 of the projector 200 reads out its own IP address and group name that are stored in the RAM 203 and creates a group information image 700 such as that shown in FIG. 9 (step S803). Next, the CPU 201 instructs the projection control unit 207 to perform a layout change so that the group information image that was created in step S803 can be displayed at a predetermined size (step S804). Then, the projection control unit 207 controls the projection unit 206 such that the group information image 700 is projected in accordance with the layout change instruction.

Next, the CPU 201 performs control of the communication unit 205 in order to notify the PC-A and the PC-B of the display layout change according to the change notification, and of the fact that the group information image is currently being displayed (S805). The CPUs 101 of the PC-A and the PC-B that received the display layout change notification each change the appearance of the GUI 400 such that it indicates that the projector is currently displaying the group information, as shown in FIG. 7B (step S806).

As described above, according to the above embodiments, when another PC attempts to join an existing image transfer group, the user of that PC can easily find out the information regarding the group that he or she wishes to join.

Although preferable embodiments of the present invention are described above, the present invention is not limited to these embodiments, and it is possible to implement various modifications and variations within the scope of the gist of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-286165, filed Dec. 27, 2012, which is hereby incorporated by reference herein in its entirety.

What is claimed is:

1. An information processing apparatus that connects to a projection apparatus via a network, the information processing apparatus comprising:
   at least one communication interface configured to connect to the projection apparatus via the network to create a group,
   at least one processor configured to cause the communication interface to transmit an image to be displayed on a display unit of the information processing apparatus to the projection apparatus as a projection image,
   wherein the at least one processor is configured to:
      detect an instruction to display, as a projection image, on a projection plane, a group information image having information that enables a new device to join the group to the projection apparatus;
      generate the group information image having the information that enables the new device to join the group;
      transmit an instruction to change a projection layout of the projection image projected by the projection apparatus to a predetermined layout; and
      transmit the group information image to the projection apparatus so that the projection apparatus projects, on the projection plane, in accordance with the predetermined layout, the group information image having the information that enables the new device to join the group.

2. The information processing apparatus according to claim 1, wherein the at least one processor is further configured to form the group with at least one projection apparatus among apparatuses on the network.

3. The information processing apparatus according to claim 1,
wherein the information that enables the new device to join the group includes an identifier of the projection apparatus.

4. The information processing apparatus according to claim 3,
wherein the information that enables the new device to join the group of the projection apparatus includes an IP address of the projection apparatus.

5. The information processing apparatus according to claim 1,
wherein the information that enables the new device to join the group is used in order for the new device to operate as a part of the group.

6. The information processing apparatus according to claim 1,
wherein if the detection unit detects an instruction to stop projection of the parameter relating to the projection system after the image showing the identifier and the instruction to change the projection layout to the predetermined layout are transmitted, the transmission control unit causes the communication interface to transmit an instruction to change the projection layout to a layout that was used before changing to the predetermined layout.

7. The information processing apparatus according to claim 1, further comprising:
a display control unit configured to cause the display unit to display a control screen for controlling the projection system,
wherein the control screen includes a first instruction item for receiving an instruction to project the identifier.

8. The information processing apparatus according to claim 7,
wherein the control screen includes a second instruction item for receiving an instruction to stop projection of the identifier.

9. The information processing apparatus according to claim 7,
wherein the control screen includes a region indicating the state of the projection layout in the projection apparatus.

10. The information processing apparatus according to claim 7,
wherein if the image showing the identifier is transmitted to the projection apparatus, the display control unit causes the display unit to display the fact that the identifier is being displayed.

11. The information processing apparatus according to claim 1, further comprising:
a generation unit configured to generate the image showing the identifier.

12. The information processing apparatus according to claim 1,
wherein if the at least one processor detects the instruction, the at least one processor causes the communication interface to transmit, after the instruction to change the projection layout projected by the projection apparatus to the predetermined layout is transmitted and the instruction to change the projection layout is received by the projection apparatus, the group information image as the projection image.

13. The information processing apparatus according to claim 1,
wherein if the at least one processor detects the instruction, after changing the projection layout to the predetermined layout, the at least one processor furthermore causes the communication interface to transmit an instruction to display the group information image.

14. The information processing apparatus according to claim 1,
wherein the predetermined layout is a layout in which the image that is transmitted by the information processing apparatus is displayed in the entirety of a screen projected by the projection apparatus.

15. The information processing apparatus according to claim 1, further comprising:
a reception control unit configured to cause the communication interface to receive, from the projection apparatus, layout information indicating the projection layout,
wherein if the layout information indicates the predetermined layout, the transmission control unit causes the communication interface not to transmit the instruction to change the projection layout to the predetermined layout.

16. The information processing apparatus according to claim 1, wherein the at least one processor is further configured to detect an instruction for displaying an image displayed on the display unit of the information processing apparatus, wherein when the at least one processor detects the instruction for displaying an image displayed on the display unit of the information processing apparatus, the at least one processor controls the at least one communication interface to transmit the image displayed by the display unit of the information processing apparatus as a projection image via the network.

17. The information processing apparatus according to claim 1, wherein the instruction to change the projection layout is an instruction for making the size of the display area displaying the projection image equal to or larger than a predetermined percentage.

18. The information processing apparatus according to claim 1,
wherein a change of the projection layout by the instruction includes changing a display area for displaying a projection image transmitted by the information processing apparatus.

19. A method of controlling an information processing apparatus that connects to a projection apparatus via a network, the method comprising:
transmitting, via the network, an image to be displayed on a display unit of the information processing apparatus to the projection apparatus as a projection image;
detecting an instruction to display, as a projection image, on a projection plane, a group information image having information that enables a new device to join the group to the projection apparatus;
generating the group information image having the information that enables the new device to join the group;
transmitting an instruction to change a projection layout of the projection image projected by the projection apparatus to a predetermined layout; and
transmitting the group information image to the projection apparatus so that the projection apparatus projects, on the projection plane, in accordance with the predetermined layout, the group information image having the information that enables the new device to join the group.

20. A non-transitory computer-readable storage medium storing a program for causing a computer to execute a method of controlling an information processing apparatus that connects to a projection apparatus via a network and operates as part of a projection system, the method comprising:

transmitting, via the network, an image to be displayed on a display unit of the information processing apparatus to the projection apparatus as a projection image;

detecting an instruction to display, as a projection image, on a projection plane, a group information image having information that enables a new device to join the group to the projection apparatus;

generating the group information image having the information that enables the new device to join the group;

transmitting an instruction to change a projection layout of the projection image projected by the projection apparatus to a predetermined layout; and transmitting the group information image to the projection apparatus so that the projection apparatus projects, on the projection plane, in accordance with the predetermined layout, the group information image having the information that enables the new device to join the group.

21. A projection system in which a projection apparatus and a plurality of information processing apparatuses are connected via a network, comprising:

a transmission control unit configured to transmit an image to be displayed on a display unit of at least one of the information processing apparatus to the projection apparatus as a projection image;

a projection control unit configured to project an image transmitted as a projection image by the transmission control unit;

a detection unit configured to detect an instruction to display, as a projection image, on a projection plane, a group information image having information that enables a new device to join the group to the projection apparatus;

wherein the transmission control unit transmits, when the instruction to display the group information image is detected by the detection unit, the group information image having the information that enables the new device to join the group to the projection apparatus as the projection image, and wherein in a case where an image to be projected is switched from images transmitted from the plurality of information processing apparatuses to the group information image having the information that enables the new device to join the group, the group information image having the information that enables the new device to join the group is projected with a predetermined layout regardless of a projection layout before the switching.

\* \* \* \* \*